US009614427B2

(12) United States Patent
Berger et al.

(10) Patent No.: US 9,614,427 B2
(45) Date of Patent: Apr. 4, 2017

(54) MULTI-STRING INVERTER HAVING INPUT-SIDE EMC FILTER

(71) Applicant: SMA Solar Technology AG, Niestetal (DE)

(72) Inventors: Niels Berger, Niestetal (DE); Tomasz Napierala, Berlin (DE); Stefan Buchhold, Lohfelden (DE); Julia Pinne, Vellmar (DE); Frank Rueckmann, Niestetal (DE); Henrik Wolf, Kassel (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 68 days.

(21) Appl. No.: 14/683,301

(22) Filed: Apr. 10, 2015

(65) Prior Publication Data

US 2015/0222170 A1 Aug. 6, 2015

Related U.S. Application Data

(63) Continuation of application No. PCT/EP2013/068811, filed on Sep. 11, 2013.

(30) Foreign Application Priority Data

Oct. 10, 2012 (DE) .................... 10 2012 109 638

(51) Int. Cl.
*H02M 1/00* (2006.01)
*H02M 7/44* (2006.01)
(Continued)

(52) U.S. Cl.
CPC ............. *H02M 1/00* (2013.01); *H02J 3/385* (2013.01); *H02M 1/44* (2013.01); *H02M 7/44* (2013.01);
(Continued)

(58) Field of Classification Search
CPC ............ H02M 1/00; H02M 1/44; H02M 7/44; H02M 7/48; H02M 3/1584;
(Continued)

(56) References Cited

U.S. PATENT DOCUMENTS 6,438,000 B1    8/2002   Okamoto et al.
2006/0171182 A1*   8/2006   Siri ................... H02M 3/33592
                                                                                                                    363/131
(Continued)

OTHER PUBLICATIONS

International Search Report dated Nov. 10, 2014 for International Application No. PCT/EP2013/068811.
(Continued)

*Primary Examiner* — Jue Zhang
(74) *Attorney, Agent, or Firm* — Eschweiler & Associates, LLC

(57) ABSTRACT

An inverter includes a DC/AC converter, a DC intermediate circuit on the direct current input side of the DC/AC converter, multiple DC/DC converters connected in parallel to one another on the output side to the DC intermediate circuit, multiple inputs each coupled to one of the DC/DC converters, and an EMC filter connected between the inputs and the DC/DC converters. The EMC filter includes chokes in all current-carrying lines between the inputs and the DC/DC converters and filter capacitors between the inputs and the DC/DC converters leading from all the current-carrying lines to ground. The chokes in all current-carrying lines from the at least two inputs are formed by means of choke windings on a common core of a current-compensated choke.

14 Claims, 4 Drawing Sheets

(51) Int. Cl.
*H02M 1/44* (2007.01)
*H02J 3/38* (2006.01)
*H02M 7/48* (2007.01)
*H02M 3/158* (2006.01)

(52) U.S. Cl.
CPC ............ *H02M 7/48* (2013.01); *H02M 3/1584* (2013.01); *H02M 2001/007* (2013.01); *H02M 2001/0074* (2013.01); *Y02E 10/58* (2013.01)

(58) Field of Classification Search
CPC ..... H02M 2001/007; H02M 2001/0074; H02J 3/385; Y02E 10/58
See application file for complete search history.

(56) References Cited

U.S. PATENT DOCUMENTS

| | | | | |
|---|---|---|---|---|
| 2008/0291706 | A1* | 11/2008 | Seymour | H02M 1/126 363/40 |
| 2009/0160258 | A1* | 6/2009 | Allen | H02J 1/10 307/82 |
| 2009/0189574 | A1* | 7/2009 | Le | G05F 1/67 323/234 |
| 2010/0207560 | A1 | 8/2010 | Itoh et al. | |
| 2012/0081938 | A1* | 4/2012 | Kuenzel | H02M 1/126 363/123 |
| 2012/0140363 | A1* | 6/2012 | Jeppe | H02H 7/1222 361/18 |
| 2013/0076150 | A1* | 3/2013 | Wagoner | H02M 3/1584 307/82 |

OTHER PUBLICATIONS

Translation of the Relevant Sections Are Marked in Blue in the Doucment. Schwab, Adolf. "Elektromagnetische Verträglichkeit—Electromagnetic Compatibility." Springer-Verlag Berlin Heidelber, ISBN: 978-3-642-16609-9. Published in 2011.

* cited by examiner

MULTI-STRING INVERTER HAVING INPUT-SIDE EMC FILTER

REFERENCE TO RELATED APPLICATION

This application is a continuation-in-part of international application number PCT/EP2013/068811, filed on Sep. 11, 2013, which claims priority to German Application number 10 2012 109638.4, filed on Oct. 10, 2012.

FIELD

The disclosure relates to an inverter, in particular an inverter comprising multiple inputs and multiple DC/DC-converters. Due to the multiple inputs and multiple DC/DC converters of an inverter of this type, it is possible to connect multiple current sources and to operate an inverter of this type at different voltages. This renders it possible by way of example in the case of multiple photovoltaic generators that are connected to the inverter to perform a mutually independent MPP tracking process. Inverters of this type are then also described as multi-string inverters.

BACKGROUND

In the case of chokes of an EMC filter through which a direct current flows in addition to the interference that is to be suppressed, it is known to prevent the direct current from saturating the core of said EMC filter by virtue of the fact that the chokes in a forwards conductor and an associated rearwards conductor for the direct current are wound onto a common core in such a manner that the magnetizations of the core due to the direct current flowing through the two chokes are eliminated. Common mode interference that is coupled in on one side of the chokes into the forwards conductor and the return conductor results in contrast in the core being magnetized in a variable manner starting from zero and is accordingly damped. Chokes of this type having multiple choke windings on a common core are described collectively as current-compensated chokes.

It is known for example from the products Sunny Boy 4200 TL HC and Sunny Boy 5000 TL HC of the applicant to use in each case a current compensated choke for the two lines that lead from one of multiple inputs of a multi-string inverter to the associated DC/DC converter. However, the EMC filter of a multi-string inverter of this type having a current-compensated choke for each input comprises in its entirety on the one hand a considerable amount of mass due to its chokes and at the same time its filtering effect is not optimal across the different operating modes of the multi-string inverter.

The hitherto typical operating mode of a multi-string inverter is characterized by a mutually independent MPP tracking of the individual photovoltaic generators that are connected to the multi-string inverter. However, a further, hitherto non-relevant operating mode also comes into focus with respect to a use of multi-string inverters within larger photovoltaic systems. This operating mode is characterized by a hard parallel connection of at least two DC inputs of the multi-string inverter. The photovoltaic generators that are connected to the parallel connected DC inputs are thus operated during the operation as a single photovoltaic generator with uniform MPP tracking. Therefore, an operating mode wherein multiple DC inputs of the multi-string inverter are hard-wired is also included in the possible operating modes of a multi-string inverter that can also be used within larger photovoltaic systems.

The hard coupling of different photovoltaic generators can be performed already in the field but also by means of bridging the different inputs of the multi-string inverter and this leads to the corresponding DC/DC converters between the hard-wired inputs on the one hand and the DC intermediate circuit on the input side of the downstream-connected DC/AC converter on the other hand being parallel connected. In this case, even small unbalances of the DC/DC converter can cause the return flow of the direct current from one of the inputs to another of the inputs and as a consequence the cores of the two current-compensated chokes that are allocated to these inputs are already saturated by the unbalanced distributed direct current. These different photovoltaic generators are thus unsuitable for their intended purpose of damping high frequency common-mode interference.

EP 2 276 136 A1 that relates to an overvoltage protection for inverters that have an input-side EMC filter describes an inverter having a DC input stage. The DC input stage includes an EMC filter that has interference suppression inductances in all four supply lines that lead off from two photovoltaic generators, wherein the interference suppression inductances in the two supply lines for each photovoltaic generator are magnetically coupled to a current-compensated choke. Furthermore, the EMC filter comprises interference suppression capacitances that are provided between the respective two supply lines of a photovoltaic generator on the one hand and the supply lines and ground on the other hand. When viewed from the photovoltaic generators upstream of the EMC filter, overvoltage conductors are provided that deflect transient overvoltages to each of the supply lines with respect to one of the other supply lines or ground. When viewed from the photovoltaic generators downstream of the EMC filter, in addition a secondary overvoltage protection is provided that protects the downstream parts of the inverter from transient overvoltages that despite the primary overvoltage protection pass as far as to downstream of the EMC filter or that are even further amplified by means of the EMC filter that is excited in a manner that produces oscillations. The secondary overvoltage protection comprises overvoltage conductors that are connected between dedicated current-carrying supply lines of each of the two photovoltaic generators on the one hand and ground on the other hand and a current-carrying line, combined downstream of the EMC filter, of the two photovoltaic generators on the one hand and ground on the other hand. All current-carrying lines supply current to a DC/DC converter of the DC input stage. Furthermore, buffer capacitances are provided in the DC input stage.

EP 1 209 704 A1 discloses a current-compensated choke having a core embodied from ferromagnetic material for suppressing high frequency interference signals in an electrical circuit of two voltage systems. The electrical circuit comprises at least two switching circuits that have a common reference current path and in each case a dedicated current path. In the two switching circuits, different voltages prevail between the respective dedicated current path and the common reference current path. The two switching circuits have only the reference current path in common. Chokes are arranged in the reference current path and the dedicated current paths of the switching circuits and said chokes are embodied in each case by means of a choke winding of an equal number of windings on a common core. The currents that flow forwards in the individual switching circuits by way of the dedicated current paths and flow back by way of the common reference current path produce mutually compensating magnetizations of the common core.

The choke that is multiply current-compensated in this manner and comprises the one choke winding for the common reference current path replaces two current-compensated chokes having in each case two choke windings that would be provided for two completely separate switching circuits. The core of the choke that is multiply current-compensated is preferably an annular-shaped core on which the three choke windings are arranged at a spaced interval of 120°. Based on the figures in EP 1 209 704 A1, it is known to use the known current-compensated choke having three choke windings between a DC/DC converter having multiple outputs and different light sources. A circuit of this type is used in particular in a dual-voltage onboard power supply of a motor vehicle. This is a use in a range of considerably smaller electrical outputs and also smaller currents than flow through an EMC filter in the case of an inverter. Typical electrical lines of a few kilowatts up to a few tens of kilowatts and currents in the range between 10 A and 50 A flow by way of each input of an inverter. In addition, the known circuit does not comprise any interference suppression capacitors that are typical for an EMC filter to ground.

It is known to use a current-compensated choke having a total of three windings on a common core in EMC filters for three-phase alternating currents, wherein each phase of the alternating current is allocated a choke winding.

It is known from US 2010/0207560 A1 in the case of an electric vehicle to guide lines P, C and N between a converter and an inverter through one or more magnetic annular cores. The annular cores are part of an interface between the one converter and the one inverter. Smoothing capacitors are connected between the lines on both sides of the annular core(s). The magnetic annular core(s) cause the effective resonance frequency to be displaced to a frequency at which there is no interference, for example from signal devices. Simultaneously, the annular core(s) increase the inductivity in the case of critical frequencies and consequently reduce the amount of noise that is generated at this frequency.

DE 100 19 461 A1 discloses an interference suppression filter that comprises an interference suppression filter circuit stack that is surrounded at least in part by a magnetic body and forms a choke and capacitor arrangement. Respective mutually insulated interference suppression filter circuits that are stacked one on top of the other are provided in the stack and each of said circuits comprises multiple, mutually insulated LC composite elements that are stacked one on top of the other. These LC composite elements comprise for their part in each case a main coil and a ground coil, both of which are in a spiral shape with an essentially rectangular cross-section and are fastened to one another by means of interpositioning multiple rectangular dielectric discs. In each interference suppression filter circuit, the main coils of the associated LC-composite elements are electrically connected to one another at their inner ends in order to form a main circuit, whereas the ground coils of the LC composite elements are electrically connected at their inner ends in order to form a ground circuit. The interference suppression filter circuits form a filter that comprises a common mode choke coil and a ground capacitor for use as a filter. It is possible to combine three interference suppression filter circuits in order to produce a 3-phase filter. If in the case of the known interference suppression filter, an interference signal is transmitted from the respective main coil to the ground coil, it is possible under certain conditions for a resonance to occur between the inductance and the capacitance and the interference voltage is increased. In order to avoid such resonance occurring, a resistor is provided between the ground coil and a grounding wire. Alternatively, the ground coil itself comprises a certain resistance which eliminates the necessity of a separate resistor.

SUMMARY

The disclosure relates to an inverter comprising a DC/AC converter, a DC intermediate circuit on the DC input side of the DC/AC converter, multiple DC/DC converters, which are connected in parallel to one another on the output side to the DC intermediate circuit, multiple inputs, which lead in each case to one of the DC/DC converters, and an EMC filter that is connected between the inputs and the DC/DC converters. The EMC filter comprises chokes in all current-carrying lines between the inputs and the DC/DC converters and filter capacitors that lead from all current-carrying lines between the inputs and the DC/DC converters to earth. In accordance with the disclosure, a common current-carrying line—in addition in each case to a dedicated current-carrying line—leads from at least two inputs to the two associated DC/DC converters, wherein the chokes in all current-carrying lines from the at least two inputs are formed by means of choke windings on a common core of a current-compensated choke.

In the case of the inverter in accordance with the disclosure and having multiple inputs, the use of a single current-compensated choke with n+1 choke windings for n inputs serves on the one hand to limit the expenditure on materials and consequently also the costs involved for the chokes in the current-carrying lines from the inputs overall. On the other hand, by using the choke that is multiply current-compensated in this manner, it is achieved that in the case of bridged inputs any redistributions of the return flows between the inputs do not produce any undesired magnetization of the core of the choke that rapidly exhausts its magnetization capability, the redistributions occurring as a result of unbalances of the associated DC/DC converter. All inputs that are connected by way of the common current-compensated choke to the associated DC/DC converter can rather be bridged in optional part quantities or also in total, without the danger arising that the core of the common current-compensated choke is magnetized even without interference that is to be suppressed. This also applies if, as is usual in the case of multi-string inverters, quite considerable electric power outputs of multiple kilowatts up to a few tens of kilowatts and typical currents between 10 A and 50 A—in the case of the common current-carrying line even n-times these currents—flow through the individual choke windings. Consequently, these high power outputs or rather the direct currents that correspond thereto and that flow as normal mode currents through the multiply current-compensated choke do not impair the function of the EMC filter that with regard to the inductances of its chokes and the capacitances of its filter capacitors is tailored to suit the possibly occurring common mode interference, in particular from the region of the DC/DC converter and the DC/AC converter in order to maintain the required EMC limit values.

The advantages of the individual current-compensated choke in the case of the inverter in accordance with the disclosure are achieved because the disclosure deviates from the principle that it is necessary to provide a dedicated EMC filter for each input to which it is possible to connect a current source in order to prevent undesired couplings of the inputs and the filter elements that are provided for the inputs. Additional undesired resonance frequencies arise as a result of coupling the filter elements for the individual inputs. The coupling of inputs is particularly critical if by way of example photovoltaic generators are connected thereto, the photovoltaic generators having considerable antennae effects owing to their large surface areas. They tend therefore to a significant degree to receive interference signals and also to emit the signals which is even amplified by means of their coupling. The disclosure is based on the knowledge that the effects of these couplings can be limited to an amount that has no damaging effect so that the advantages of the single current-compensated choke can also be used practically in the case of the inverter in accordance with the disclosure.

Also based on a known current-compensated choke for the current from two switching circuits that comprise a common reference current path and in each case a dedicated current path, obstacles stand in the way of the present disclosure. The interference suppression capacitances to ground, which are to be supplemented in the case of this starting point in order to form an EMC filter, open up current paths for the undesired higher frequency alternating currents between the two switching circuits, in other words in this case the current sources that are connected to the different inputs of the inverter. Unlike in the case of a simple interference suppression measure on a purely inductive basis, the relationships in the case of a simultaneous existence of interference suppressor capacitors are therefore considerably more complex.

The complexity of the use of a single current-compensated choke in the case of the inverter in accordance with the disclosure is also not comparable to known circuits in which more than two lines are guided between always only two end positions through a current-compensated choke as an interface. These circuits correspond nonetheless to the operating mode of the inverter in accordance with the disclosure having hard-wired DC inputs. In contrast, an inverter in accordance with the disclosure comprises an effective EMC filter also in its further operating mode, namely the conventional multi-string operation of a multi-string inverter. In the case of the multi-string operation, it is necessary to filter multiple currents towards and accordingly from separate current sources.

Typical inductances of the chokes of the EMC filter of the inverter in accordance with one embodiment of the disclosure lie in the range of from 0.2 mH to 4.0 mH.

The choke winding for the choke in the common current-carrying line of the at least two inputs comprises in the case of the inverter in accordance with one embodiment of the disclosure an n-times greater line cross-section than the choke windings for each choke in one of the dedicated current-carrying lines of the at least two inputs. The n is the number of the at least two inputs. The current densities across the line cross-sections of the different choke windings is consequently at least approximately identical. This does not exclude that during the operation of the inverter greatly different currents can also flow through the individual dedicated current-carrying lines of the at least two inputs and accordingly different current densities can occur, in particular if the respective inputs are not bridged.

The n-times greater line cross-section of the choke winding for the choke in the common current-carrying line can be the line cross-section of an individual wire conductor or also the common line cross-section of multiple parallel guided wire conductors. The latter can facilitate the formation of small radii when winding the core.

In one embodiment the choke windings are wound in a symmetrical manner around the common core of the current-compensated choke of the inverter in accordance with the disclosure. This means that all choke windings for the chokes in the dedicated current-carrying lines of the individual inputs are arranged in as far as possible identical relative arrangements with an identical magnetic coupling to the choke winding of the choke in the common current-carrying lines of the at least two inputs. This is a prerequisite for the desired complete current compensation with regard to any normal mode currents through the current-compensated choke.

If the number of inputs is two, the core can be an annular core and the choke windings for each choke in one of the dedicated current-carrying lines are wound onto the annular core in a symmetrical manner with respect to the choke winding for the choke in the common current-carrying line. The annular core can be both circular and also oval. In order to achieve such symmetry of the chokes even in the case of more than two inputs and accordingly many chokes in a dedicated current-carrying line, it is also possible to use other core shapes, such as for example a core having a central connecting piece onto which is wound the choke winding for the choke in the common current-carrying line, and multiple auxiliary connecting pieces that are arranged in a circular manner and onto which is wound in each case a choke winding for a choke in one of the dedicated current-carrying lines.

Slots are generally not provided in the common core of the current-compensated choke of the inverter in accordance with one embodiment of the disclosure in order to achieve as high as possible an inductance of the individual chokes with regard to the mass of the core. Alternatively, in another embodiment the core may comprise a plurality of parts and in such a case a slot associated therewith may be minimized.

In the case of the EMC filter of the inverter in accordance with the disclosure, filter capacitors are at least provided that are connected between the chokes and the DC/DC converters to the current-carrying lines and from there are guided to ground. These filter capacitors are damped with series connected resistors in a manner that is not usual for EMC filters but is desirable in one embodiment. Fundamentally, filter capacitors are not damped as this would limit their filtering effectiveness. In the case of an inverter in accordance with one embodiment of the disclosure, it is however a very necessary prerequisite to damp the filter capacitors for the function of the EMC filter, in other words to ensure the electromagnetic compatibility of the inverter. The reason for this is that in the case of the multiply current-compensated choke of the inverter in accordance with the disclosure undesired resonances can result from parasitic stray fields and the associated couplings of the individual chokes. These resonances can jeopardize the electromagnetic compatibility of the inverter in accordance with the disclosure. However, the series damping of the filter capacitors damps it and effectively suppresses it. Consequently, the ohmic resistances that are normally counter-productive for the function of an EMC filter and damp the filtering capacities of the EMC filter are used in the case of the present disclosure in a purposeful manner for suppressing resonances that would otherwise in many cases lead to it not being possible to use a multiply current-compensated choke—despite its advantages in the case of bridged inputs of a multi-string inverter—owing to it not being possible to achieve electromagnetic compatibility of the inverter.

Insofar as the resistors that are series connected to the filter capacitors are generally necessary in the case of the inverter in accordance with one embodiment of the disclosure, it is still necessary to keep the resistors small in order to ensure the fundamental function of the EMC filter. Typically, an optimal function is achieved if in the case of capacitances of the filter capacitors of typically at least 47 nF the resistors comprise an ohmic resistance of 0.5 to 10.0 ohm, frequently from 1 to 5 ohm.

The EMC filter of the inverter in accordance with the disclosure can also comprise further filter capacitors. Thus, further filter capacitors between the inputs and the chokes can lead from the current-carrying lines to ground. These further filter capacitors then regularly have a smaller capacity than the filter capacitors that lead between the chokes and the DC/DC converters to ground. In addition, they are not damped. The further filter capacitors can comprise specific capacities of 0.2 to 33 nF and they are maximal only approximately ½ times as great and frequently maximal only ¹⁄₁₀ times as great, and frequently also only ¹⁄₂₀ times as great as the filter capacitors on the other side of the chokes.

Still further filter capacitors may be comprised in the EMC filter between the two current-carrying lines of each input, and in fact both upstream and also downstream of the chokes in these lines. These additional filter capacitors have primarily a filtering effect on the normal mode interference between the current-carrying lines.

If, in the case of the inverter in accordance with the disclosure, inputs that are connected by way of a common multiply current-compensated choke to the associated DC/DC converters are bridged, it has shown itself as helpful in order to maintain the desired electromagnetic compatibility of the inverter if the corresponding DC/DC converters are controlled synchronously. In this manner, it is avoided that high frequency (parasitic) compensating currents flow back and forth between the individual DC/DC converters. These compensating currents would otherwise impair the switching processes in the DC/DC converters, and impaired switching processes typically comprise not only more but rather in particular spectral components that have a greater disturbing effect for which it would be necessary to provide an additional filter. By virtue of synchronously controlling the switches of the respective DC/DC converters, it is possible to avoid the necessity of providing such additional filters. It is possible to control the inverter in accordance with the disclosure in a purposeful manner in order to achieve this synchronous control.

The synchronous switching is employed in accordance with an embodiment when the DC-inputs are bridged by hard wiring. This is done in some instances for EMC compliance, however, in some instances a disadvantage thereof is a larger ripple on the DC-link capacitor. In a situation where there is no hard bridging of the DC-inputs, the multi-string inverter type system can operate in a maximum power point (MPP) tracking system for each of the photovoltaic generators. In such an embodiment the switches of the respective DC/DC converters do not need to be operated in a synchronous fashion, but in an offset or interleaved manner. Regardless of whether such switching is performed synchronously, or not synchronously, such switching control is provided by a controller in accordance with one embodiment.

In one embodiment, therefore, multiple parallel connected DC/DC converters of an inverter are controlled in an offset or interleaved manner with respect to one another in order to reduce a signal ripple of a current that is commonly output by the DC/DC converters. In the case of an inverter in accordance with the disclosure, and in particular an inverter which DC-inputs are bridged by hard wiring, this is intentionally omitted and a greater current ripple is accepted in order to be able to use the advantages of the single current-compensated choke without impairing the function of the EMC filter.

In one embodiment the common core of the current-compensated choke is arranged in an upright manner within a housing of the inverter in order to facilitate cooling in particular convection cooling of the chokes. It is expedient to arrange the choke winding for the choke in the common current-carrying line at a site being more easily accessible for a cooling air current for the current-compensated choke in comparison to the choke winding for each choke in one of the dedicated current-carrying lines, because during operation of the inverter in accordance with the disclosure the warmest point of the current-compensated choke is formed in the region of this choke winding.

Advantageous further developments of the disclosure are evident in the claims, description and drawings. The described advantages of features and combinations of multiple features are merely examples and can be used alternatively or cumulatively without embodiments in accordance with the disclosure having to achieve the advantages. Without the subject matter of the attached claims being changed as a result, the following applies with respect to the disclosed content of the original application documents and the patent: further features are evident in the drawings—in particular the illustrated geometries and the relative dimensions of multiple components with respect to one another and also their relative arrangement and operative connection. The combination of features of different embodiments of the disclosure or of features of different claims is likewise possible by way of derogation from the selected back references to claims and is hereby suggested. This also relates to such features that are illustrated in separate drawings or are mentioned in their description. These features can also be combined with features of different claims. It is likewise possible to omit for further embodiments of the disclosure features that are mentioned in the claims.

The features mentioned in the claims and the description are to be understood with respect to their number in such a manner that precisely this number or a greater number is provided than the mentioned number without requiring the explicit use of the adverb 'at least'. If therefore by way of example an element is mentioned, then this is to be understood to mean that precisely one element, two elements or more elements are provided. These features can be supplemented by other features or be the single features that produce the respective product.

The reference numerals used in the claims do not represent any limitation of the scope of the subjects protected by means of the claims. The reference numerals merely serve the purpose of making the claims easier to understand.

BRIEF DESCRIPTIONS OF THE DRAWINGS

The disclosure is further explained and described hereinunder with reference to the attached drawings.

DETAILED DESCRIPTION

The disclosure relates to an inverter, in particular an inverter comprising multiple inputs and multiple DC/DC-converters. Due to the multiple inputs and multiple DC/DC converters of an inverter of this type, it is possible to connect multiple current sources and to operate an inverter of this type at different voltages present at the multiple inputs. This renders it possible by way of example in the case of multiple photovoltaic generators that are connected to the inverter to perform a mutually independent MPP tracking process for each of the multiple photovoltaic generators. Inverters of this type are then also described as multi-string inverters.

In the case of the EMC filter that is provided between the inputs and the associated DC/DC converters, interference from the region of the inverter is prevented from coupling into the connected current sources. There is therefore the danger particularly in the case of connected photovoltaic generators due to their large surface area that in the case of coupled-in interference said voltaic generators act as transmitter antennae for electromagnetic waves. In order to avoid the emission of such electromagnetic waves, the EMC filter is to be tailored to suit the EMC limit values that are defined in the corresponding standards (e.g.: CE, FCC Specifications). When the inverter adheres to these limit values, it is to be assumed that the emission of electromagnetic waves is sufficiently reduced.

Figure 1:
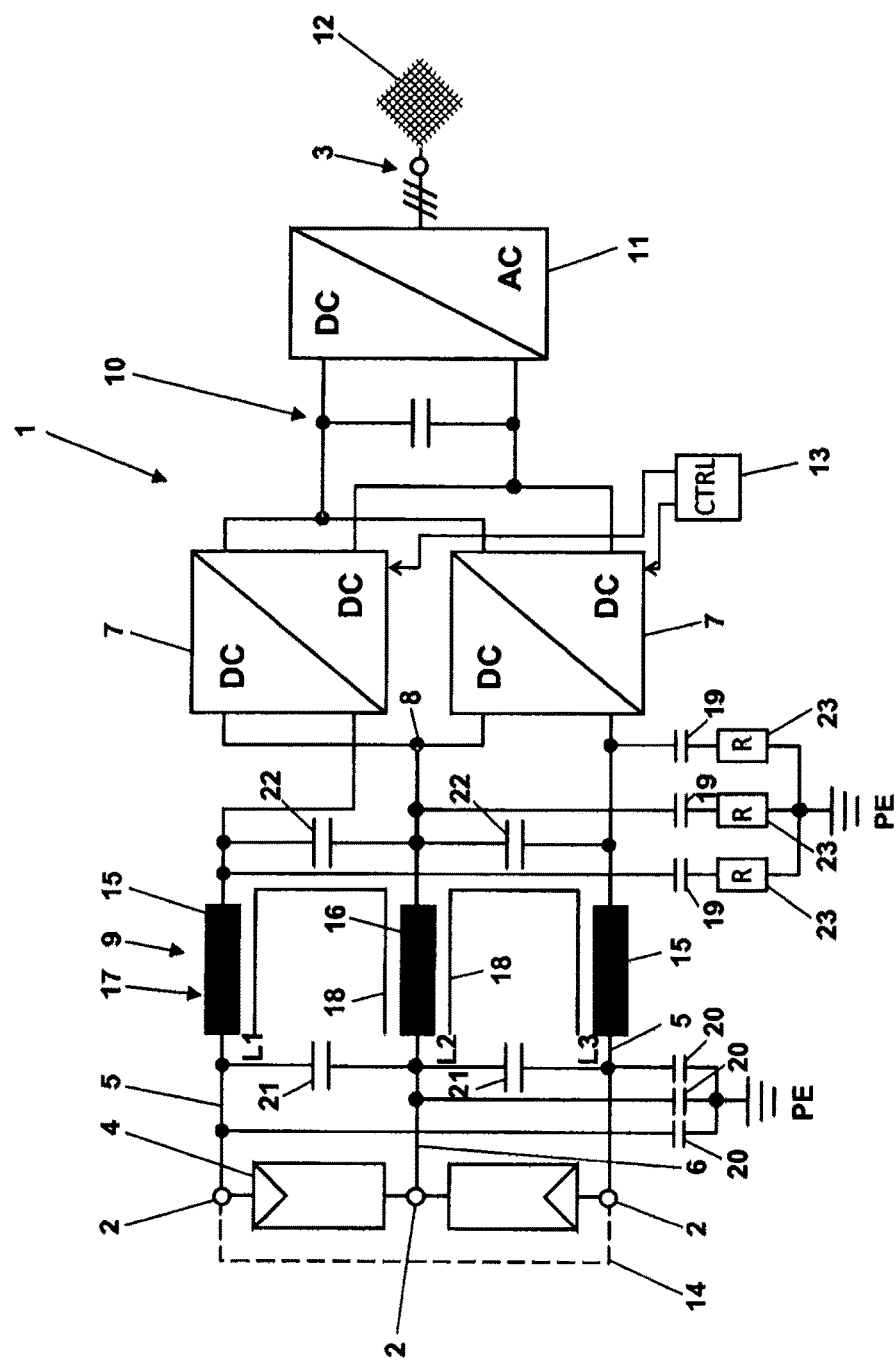
FIG. 1 is a schematic circuit diagram of a first embodiment of an inverter in accordance with the disclosure having two photovoltaic generators that are connected on the input side and an alternating current network that is connected on the output side.

FIG. 1 illustrates an inverter 1 having two inputs 2 and an output 3. The inputs 2 are located on a direct current input side of the inverter 1 and are provided for connecting direct current sources. FIG. 1 shows a photovoltaic generator 4 connected to each of the inputs 2. Two current-carrying lines 5 and 6 extend from each input 2 to a DC/DC converter 7 that is allocated to this input 2. The current-carrying lines 5 are dedicated current-carrying lines of the respective inputs 2, whereas the current-carrying line 6 extends from all inputs 2 jointly to all DC/DC converters 7 and only at a point 8 downstream of an EMC filter 9 do they branch off to the individual DC/DC converters 7. The EMC filter 9 is provided between the inputs 2 and the DC/DC converters 7 for all current-carrying lines 5 and 6 and is described in detail in the following paragraph. The DC/DC converters 7 are connected in parallel on the output side to a direct current intermediate circuit 10 on the input side of a DC/AC converter 11. The DC/AC converter 11 is for its part connected—optionally by means of (not illustrated in the figure) interpositioning one or multiple further filters, transformers, protectors and the like—to the output 3. The inverter 1 supplies electrical energy by way of the output 3 from the photovoltaic generators 4 into an alternating current network 12. FIG. 1 illustrates a 3-phase DC/AC converter 11, the output 3 of which feeds electrical power into the 3-phases of an alternating current network 12. However, the disclosure can also be used on an inverter 1 having a 1-phase DC/AC converter 11. In order to maximize the electrical energy that is fed into the alternating current network 12, it is possible using the inverter 1 to perform an independent MPP (maximum power point) tracking for each individual photovoltaic generator 4. For this purpose, the DC/DC converters 7 are controlled by a controller 13 in such a manner that the photovoltaic generators 4 are operated at an optimal voltage. As a result, different voltages can prevail across the two inputs 2. As a result of being able to operate the DC/DC converters 7 separately, the inverter 1 is a so-called multi-string inverter. The two inputs 2 can however also be bridged outside the inverter 1 or within the inverter, in other words hard-wired which is indicated by an optional electrical connection 14 illustrated by the broken line. The two DC/DC converters 7 are not only connected in parallel on the output side to the direct current intermediate circuit 10 but rather are also connected in parallel on the input side to the bridged inputs 2. In this case, the controller 13 controls the DC/DC converter 7 in a synchronous manner and balances in an ideal manner the currents flowing by way of the two DC/DC converters 7 in order to achieve a uniform utilization and consequently also uniform loading. Nevertheless, it can happen—solely as a result of unavoidable unbalances between the components—that a current that is flowing forwards by way of one of the lines 5 to one of the DC/DC converters 7 flows back by way of the other DC/DC converters 7 to the point 8. However, since the two DC/DC converters 7 are connected at the point 8 to one another and to the current-carrying line 6, this lack of symmetry in the region of the EMC filter 9 has no effect.

The EMC filter 9 comprises chokes 15 and 16 in the current-carrying lines 5 and 6. Reference is also made hereinunder to these chokes 15 and 16 and the inductances L1, L2 and L3 that are provided by said chokes. The chokes 15 and 16 are magnetically coupled so that together they form a multiply current-compensated choke 17. In other words, the magnetization of a common core 18 of the multiply current-compensated choke 17 as a result of the current flowing forwards through the chokes 15 is compensated for by the current flowing rearwards through the choke 16. Direct current power that is flowing as normal mode currents from the photovoltaic generators 4 through the current-compensated choke 17 do not consequently impair the magnetizability of the core 18, in contrast to common mode interference that is to be damped using the EMC filter 9, in particular from the region of the DC/DC converters 7 and the DC/AC converter 11.

In addition to the choke 17, the EMC filter 9 comprises filter capacitors 19 to 22. The filter capacitors 19 are provided in branches from the current-carrying lines 5 and 6 between the choke 17 and the DC/DC converters 7 to ground potential PE (or in short, ground). These filter capacitors 19 are series connected with resistors 23. The filter capacitors 19 are consequently in fact provided in an arrangement that is conventional for EMC filters. Their series damping using the resistors 23 is however rather unusual, even if the resistors 23 comprise in each case only one single ohmic resistor of a few ohms. The importance of the resistors 23 is discussed in detail in connection with FIGS. 2 and 3. The filter capacitors 20 also lead from the current-carrying lines 5 and 6 to ground PE. They are however provided on the input side of the choke 17, in other words between the choke and the inputs 2. In addition, the electrical capacitance of the filter capacitors 20 amounts typically to only one tenth or less of the electrical capacitance of the filter capacitors 19. The filter capacitors 21 are connected on the input side of the choke 17 and the filter capacitors 22 are connected on the output side of the choke 17 between the current-carrying lines 5 and 6. Apart from the resistors 23, the entire arrangement of the filter capacitors 19 to 22 of the EMC filter 9 is not fundamentally unusual. However, in this case, the arrangement of the filter capacitors 19 to 22 is tailored to suit the common current-carrying line 6 for the two inputs 2. However, the unusual embodiment is that, in addition to the multiple current-compensating choke 17 with the choke 16 in the common current-carrying line 6, the resistors 23 are used in the series damping of the filter capacitors 19.

Figure 2:
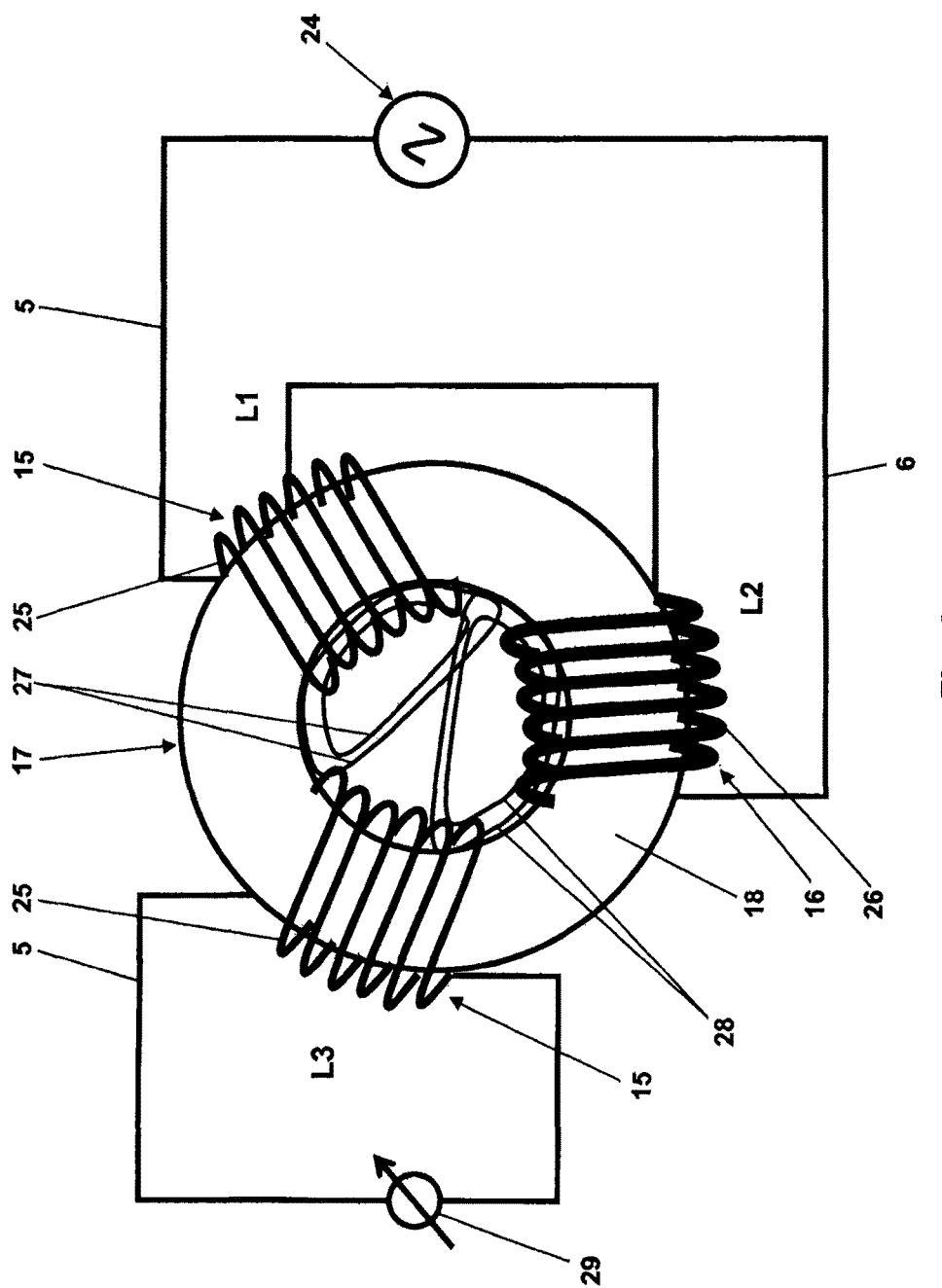
FIG. 2 illustrates separately and schematically a multiply current-compensated choke having three choke windings on a common core for explaining the occurrence of resonances as a result of unbalanced stray fields about the individual choke windings.

FIG. 2 illustrates a specified embodiment of the current-compensated choke 17 having choke windings 25 and 26 for forming the chokes 15 and 16 in the current-carrying lines 5 and 6 on the common core 18. FIG. 2 indicates by means of a bolder line for illustrating the choke winding 26 that the choke winding comprises a twice as large line cross-section than the choke windings 25. This takes into account the fact that the total of the current flowing forwards through the two choke windings 25 flows back through the choke winding 26. The core 18 is embodied from a magnetizable material, such as by way of example a nanocrystalline ferromagnetic metal sheet that is wound up to form a band core, or a ferromagnetic material and is not provided with slots. If an interference signal 24 is coupled in on the output side into the series-connected inductances L1 and L2, the high frequency interference signal 24 produces stray fields that change over time and are indicated in FIG. 2 by means of field lines 27 and 28. These stray fields issue from the choke windings 25 and 26 of the inductances L1 and L2 and pass through the choke winding 25 of the side choke 15 with the inductance L3. Since, even as a result of the smallest differences in the winding geometries, the stray fields are never completely identical, a high frequency (HF) voltage is induced in the inductance L3 as a result of asymmetrical relationships and the high frequency voltage is indicated by a high-ohmic voltage measuring device 29, by way of example an oscilloscope, which is connected to the inductance L3. This opposing induction fundamentally always occurs, in other words also then, if a HF voltage source is connected to the inductance L3 itself. In this case, the voltage that is applied by means of this further voltage source and the voltage that is caused by means of the opposing induction are superpositioned in an additive manner according to the superposition principle.

FIG. 2 illustrates the choke winding 26 in the form of a single core thick wire conductor that corresponds in its line cross-section to the total of the line cross-sections of the two choke windings 25. It is however also possible to achieve the corresponding greater line cross-section in the form of multiple wire conductors that are wound in parallel within the choke winding 26. As a consequence, it is possible in fact to generate amongst each other parasitic resonance effects of the two parallel wound wire conductors that can generate the additional EMC interference signals or rather also interference frequencies. Nonetheless, depending upon the application case, a subdivision of this type can be advantageous for example with respect to converting narrower bending radii.

Current-compensated chokes having three identical choke windings on a common annular shaped core are known for three-phase alternating currents. These current-compensated chokes are frequently mounted in an upright manner within a housing for reasons of achieving improved cooling. By arranging the chokes in this manner within the housing, it is rendered possible to improve and increase the large area contact with a cooling air current—either driven separately or self-adjusting as a result of the different heat levels. For the present case of a choke 17 having multiple separate choke windings 25 and a choke winding 26 having a thicker line cross-section, it has been shown that the warmest point on the choke 17 during the operation of the EMC filter 9 lies in the region of the choke winding 26. This is mainly as a result of the fact that owing to the so-called "proximity effects" (e.g. skin effect) the current density in the wire conductor is not homogenous but rather concentrates in an increasing manner on the edge region of the wire conductor. This non-homogenous current distribution leads in the case of a single core conductor having n-times the cross-section to slightly higher ohmic losses than is the case in the case of n conductors having a simple cross-section. For this reason, it is advantageous to cool particularly well precisely the region of the choke winding 26. It is therefore advantageous in the case of an upright (i.e. standing) arrangement of the choke 17 in the inverter, if the choke winding 26 in comparison to the choke windings 25 is arranged at a site that is particularly well exposed to the air flow—this is generally the upper region of the choke 17, wherein the choke windings 25 are then arranged laterally downwards. In this manner, the thermally critical region (hot spot) of the choke 17 is in better contact with the cooling air current than the thermally non-critical choke windings 25 that are located lower down and are partially shielded at this site possibly by other components from the cooling air current.

Figure 3:
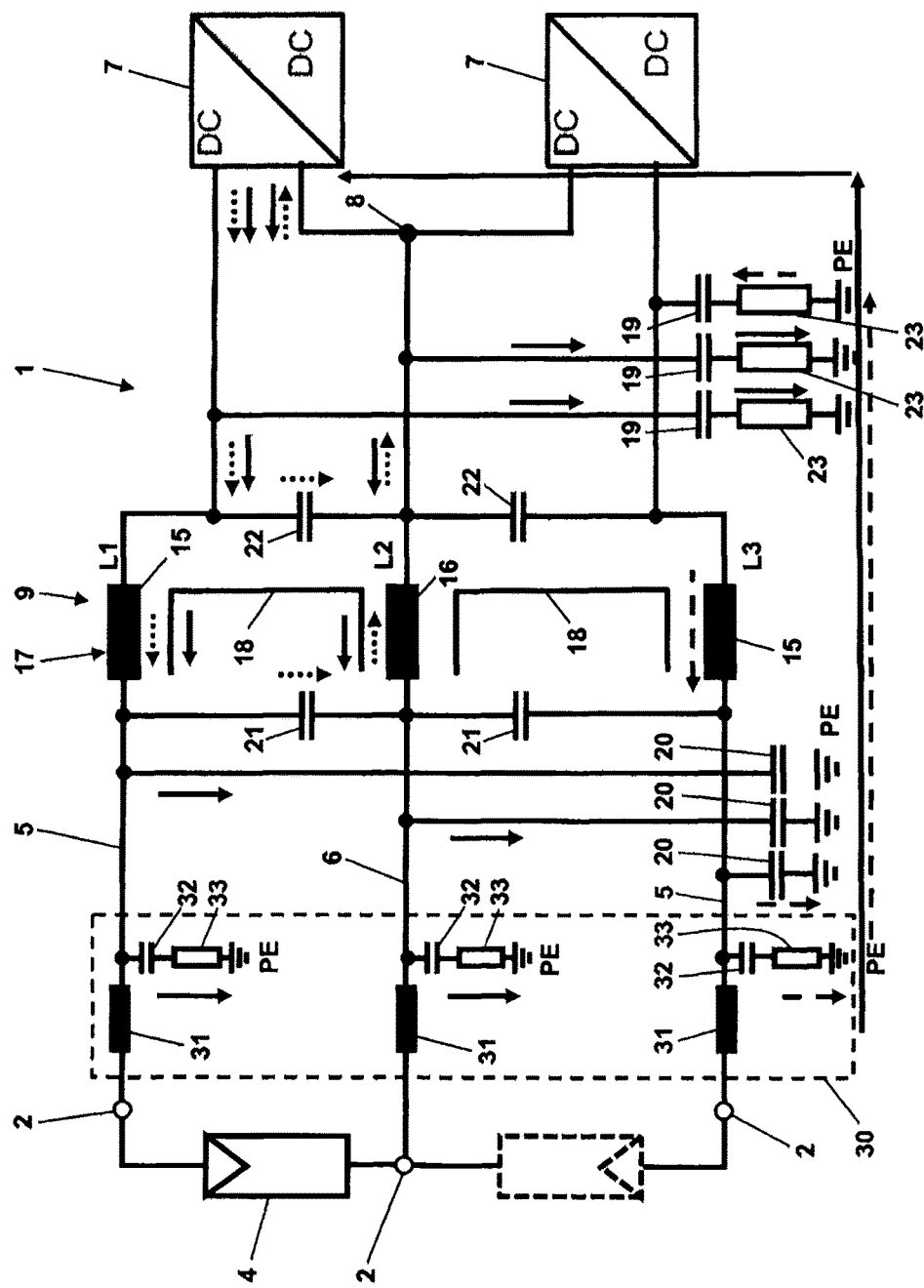
FIG. 3 illustrates an EMC measurement on an inverter corresponding to FIG. 1, wherein a photovoltaic generator is connected only to one input.

FIG. 3 illustrates the effects of the asymmetrical stray fields in accordance with FIG. 2 on the EMC compatibility of the inverter 1 in accordance with FIG. 1. The inverter 1 is illustrated in this figure only from the inputs 2 to the DC/DC converters 7. However, FIG. 3 additionally illustrates an EMC measuring arrangement 30 with associated chokes 31 in the current-carrying lines 5 and 6, associated capacitors 32 that lead from current-carrying lines 5 and 6 to ground PE and measuring resistors 33 in order to measure as a voltage drop the currents that are flowing by way of the capacitors 32 to ground PE. A measuring arrangement of this type having standardized inductances of the chokes 31, capacitances of the capacitors 32 and ohmic resistances of the measuring resistors 33 is prescribed in the case of type tests to establish electromagnetic compatibility EMC of inverters of this type, as they are the subject of the present disclosure. This measuring arrangement and its dimensioning is by way of example defined in the standards that are relevant for performing an EMC test. By virtue of the measuring arrangement 30, defined boundary conditions are created in order to ensure compatibility of different EMC measurements that are generally performed on different device types. The EMC measuring arrangement 30 is accordingly necessary for performing the EMC test but not for the normal operation of the inverter 1.

For the purpose of a simpler explanation of the effects of the asymmetrical stray fields, FIG. 3 illustrates a case and is considered hereinunder in which a photovoltaic generator 4 is connected only to the upper input 2, whereas the other input 2 is open. Although the following explanation is provided for this special case, the occurring effects can also be transferred to the other operating modes of the inverter 1 as a result of the superpositioning principle of the voltages that are induced by means of the stray fields. Furthermore, only the upper DC/DC converter 7 is activated, whereas the lower DC/DC converter 7 remains deactivated. The activated DC/DC converter can then be considered as a result of its high frequency switching arrangements as an interference generator for high frequency interference signals and a high frequency interference current that is associated therewith. This interference current is initially presupposed as a pure normal mode interference current. This normal mode interference current does not "see" the inductances L1 and L2 of the choke 17 and flows, as is indicated by arrows with a dotted line, in the DC circuit through the EMC filter 9. Voltages do not drop across the measuring resistors 33 of the EMC measuring arrangement 30, the measuring resistors being allocated to the inductances L1 and L2, and accordingly there is no EMC-relevant signal to detect. However, a HF interference signal is measured at the measuring resistor 33 that is allocated to the inductance L3, in other words the dedicated current-carrying line 5 of the open input 2. This results from the voltage that is induced in accordance with FIG. 2 in L3. The corresponding HF interference current whose path is indicated by means of arrows with a broken line flows towards ground PE and by way of the large dimensioned filter capacitor 19 back to the inductance L3. If one considers the current circuit by way of the filter capacitors 20 left of the choke 17 as closed, then this represents a resonance circuit that determines the interference current by means of the measuring arrangement 30. In order that the resonance in this resonance circuit does not achieve an oversized value, the resistors 23 are provided. These reduce the HF interference current and consequently also the EMC interference signal that results therefrom. The provision of resistors 23 in series with all filter capacitors 19 does not only have symmetry reasons but rather also takes into consideration complex couplings between the inductances L1, L2 and L3 of potential occurring interference.

Generally, an interference current is composed of normal mode portions and common mode portions. The behavior of the EMC filter 9 in the case of common mode currents is illustrated for the present special case in FIG. 3 by arrows with a continuous line. In contrast to a normal mode current in accordance with the broken arrows, the common mode current "sees" the inductances L1 and L2 and is reduced by means of the inductances. The larger filter capacitors 19 are connected upstream of the chokes 15 and 16 to ground (with respect to the direction of the common mode interference current) in order to offer the interference a desired short return path to its source, so that the interference remains locally restricted. The common mode currents that still prevail downstream of the inductances L1, L2 flow proportionally by way of the upper and middle filter capacitor 20 and the upper and middle capacitor 32 and the series-connected measuring resistors 33 of the EMC measuring arrangement 30 to ground PE and determine thus the EMC interference signal that is measured at this site. Also in the case of common mode currents, a voltage is produced in the inductance L3 of the lower choke 15, the voltage being produced as a result of the asymmetrical arrangement of the stray fields and drives an interference current that is illustrated by means of the broken-line arrows by way of the PE and the associated filter capacitor 19. Also in this case, the magnitude of the interference currents is reduced by means of the series-connected resistor 23.

For the part of the HF interference current that is discharged directly at the output of the DC/DC converter by way of the large filter capacitors 19 for the purpose of locally restricting the interference to PE, the resistors 23 do in fact have a counter-productive effect since this directly discharged interference current portion is reduced. If, however, the dimensions of the resistors 23 remain small, it is possible to achieve a good compromise between the two mutually opposing goals: (1) best possible decoupling of the HF interference signal at the DC/DC converters that act as interference signal generators, and (2) best possible damping of the subsequently still available, in other words not immediately decoupled, interference currents and of the interference currents that are induced by this.

In addition, the synchronous control of the DC/DC converter 7 in the case of bridged inputs 2 ensures an almost identical interference spectrum as in the case of the independent operation of the two DC/DC converters 7 without the inputs being bridged, so that it is simpler to tailor the EMC filter accordingly. Furthermore, good thermal management is achieved in the inverter 1 by means of the synchronous control and the flow of transverse currents is prevented.

Figure 4:
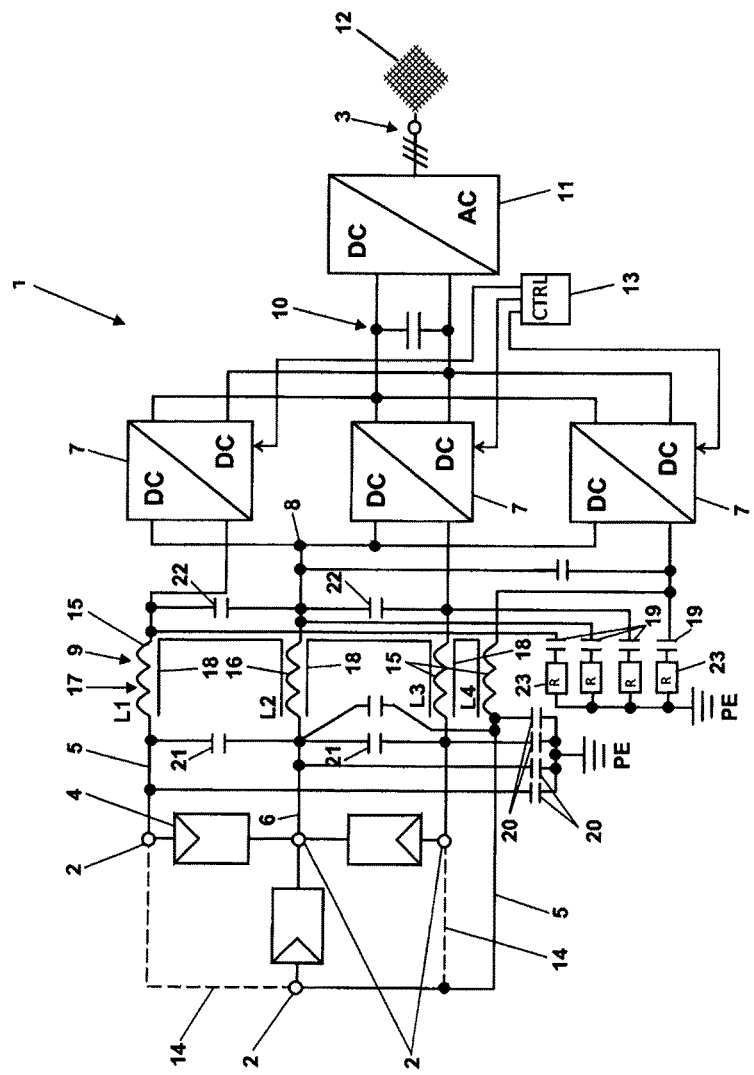
FIG. 4 illustrates a further embodiment of an inverter having three inputs and three photovoltaic generators that are connected thereto.

FIG. 4 illustrates an embodiment of the inverter 1, wherein three inputs 2 and accordingly three DC/DC inverters 7 are provided. Of these three inputs 2, a total of three dedicated current-carrying lines 5 and a common current-carrying line 6 lead through the multiply current-compensated choke 17. The choke winding for the choke 16 in this figure has a line cross-section that is three times as large as the choke windings for the chokes 15. In the case of the inverter 1 in accordance with FIG. 4, either two of the inputs 2 can be bridged or alternatively all three inputs 2 can be bridged as is indicated by means of the two broken lines 14. Otherwise, not only the construction but also the function of the inverter 1 in accordance with FIG. 4 corresponds to the construction and function of the inverter 1 of the previous figures.

The invention claimed is:

1. An inverter, comprising:
a DC/AC converter,
a DC intermediate circuit coupled to a direct current input side of the DC/AC converter,
multiple DC/DC converters connected in parallel to one another on an output side thereof, wherein the output side of the multiple DC/DC converters is coupled to the DC intermediate circuit,
multiple inputs that are each coupled to an input of one of the DC/DC converters, respectively,
an EMC filter connected between the multiple inputs and the inputs of the DC/DC converters,
wherein the EMC filter comprises:
chokes in all current-carrying lines between the multiple inputs and the inputs of the DC/DC converters, and
filter capacitors that lead from all the current-carrying lines to ground between the multiple inputs and the inputs of the DC/DC converters,
wherein one of the current-carrying lines comprises a common current-carrying line that leads from an input to the multiple DC/DC converters, and
wherein the chokes in all the current-carrying lines comprise choke windings on a common core of a current-compensated choke; and
a controller configured to control switches of the DC/DC converters in a synchronous manner when the multiple inputs of the inverter are connected in parallel by means of hard-wiring their current-carrying lines.

2. The inverter as claimed in claim 1, wherein the chokes each comprise an inductance of between 0.2 mH to 4.0 mH.

3. The inverter as claimed in claim 1, wherein the choke winding for the choke in the common current-carrying line comprises a line cross-section that is n-times greater than the choke winding for each choke in one of the current-carrying lines that is not the common current-carrying line, wherein n is the number of the inputs.

4. The inverter as claimed in claim 3, wherein the n-times greater line cross-section of the choke winding in the common current-carrying line is a line cross-section of an individual thick wire conductor.

5. The inverter as claimed in claim 3, wherein the n-times greater line cross-section of the choke winding in the common current-carrying line is a total line cross-section of multiple parallel guided wire conductors.

6. The inverter as claimed in claim 1, wherein the choke windings are wound on the common core in a symmetrical manner.

7. The inverter as claimed in claim 1, wherein the common core is a core that is not provided with slots.

8. The inverter as claimed in claim 1, wherein the common core is arranged in an upright manner within a housing of the inverter, wherein the choke winding for the choke in the common current-carrying line is arranged at a location within the inverter that is more easily accessible to a cooling air current for the current-compensated choke in comparison to the choke windings for each choke in one of the current-carrying lines that are not common current-carrying lines.

9. The inverter as claimed in claim 1, wherein the filter capacitors between the chokes and the DC/DC converters are coupled to ground.

10. The inverter as claimed in claim 9, wherein the filter capacitors are each coupled to ground through series-connected resistors.

11. The inverter as claimed in claim 10, wherein the filter capacitors comprise a capacitance of at least 47 nF and the resistors comprise an ohmic resistance of between 0.5 to 10 ohm.

12. The inverter as claimed in claim 9, further comprising other filter capacitors between the inputs and the chokes, wherein the other filter capacitors are coupled to ground and are not damped with resistors, and comprise a smaller capacitance than the filter capacitors that are coupled at one node between the chokes and the DC/DC converters and coupled to ground.

13. The inverter as claimed in claim 12, wherein the other further filter capacitors comprise a capacitance of between 0.2 nF to 33 nF.

14. An operation method for an inverter comprising:
providing an inverter comprising:
 a DC/AC converter,
 a DC intermediate circuit coupled to a direct current input side of the DC/AC converter,
 multiple DC/DC converters connected in parallel to one another on an output side thereof, wherein the output side of the multiple DC/DC converters is coupled to the DC intermediate circuit,
 multiple inputs that are each coupled to an input of one of the DC/DC converters, respectively, wherein the multiple inputs are connected in parallel by means of hard-wiring their current-carrying lines,
 an EMC filter connected between the multiple inputs and the inputs of the DC/DC converters,
 wherein the EMC filter comprises:
  chokes in all current-carrying lines between the multiple inputs and the inputs of the DC/DC converters, and
  filter capacitors that lead from all the current-carrying lines to ground between the multiple inputs and the inputs of the DC/DC converters,
  wherein one of the current-carrying lines comprises a common current-carrying line that leads from an input to the multiple DC/DC converters, and
  wherein the chokes in all the current-carrying lines comprise choke windings on a common core of a current-compensated choke; and
 a controller configured to control switches of the DC/DC converters; and
controlling the switches of the DC/DC converters in a synchronous manner via the controller.

* * * * *